Patented Feb. 12, 1952

2,585,499

UNITED STATES PATENT OFFICE 2,585,499

PRODUCTION OF SHAPED ARTICLES FROM ACRYLONITRILE POLYMERS

George M. Rothrock, Kenmore, N. Y., assignor to E. I. du Pont de Nemours & Company, Wilmington, Del., a corporation of Delaware No Drawing. Application July 29, 1948, Serial No. 41,401

8 Claims. (Cl. 18—54)

This invention relates to the production of shaped articles from acrylonitrile polymers. Further, it relates to the formation of compositions of acrylonitrile polymers which may readily be shaped into articles. More particularly, it relates to the formation of shaped articles from acrylonitrile polymers by the use of non-solvent impregnants.

By "shaped articles" is meant monofils, filaments, fibers, yarns, films, ribbons, threads, tubes, etc. By "non-solvent impregnants" is meant materials which are not solvents for the acrylonitrile polymers yet which facilitate the formation of shaped articles therefrom, presumably by decreasing the friction between surfaces as the polymer is forced through the shaped orifices.

Polyacrylonitrile and copolymers or interpolymers of acrylonitrile in which at least 85% by weight of the polymer is acrylonitrile have been known for some time. These possess desirable physical and chemical properties including toughness, insolubility and insensitivity to common solvents, such as water, methyl or ethyl alcohol, acetone, ethyl ether, ethyl acetate, hydrocarbon solvents, chlorinated hydrocarbons and the like. Because of these facts, numerous attempts have been made to form yarns, films, and other shaped articles from these polymers. The invention of George H. Latham disclosed in U. S. 2,404,714 represents the first successful preparations of acrylonitrile polymer solutions which are suitable for the production of commercially useful textile yarns or wrapping tissues and films with similar tough, flexible properties.

The solvents disclosed by Latham and other known solvents for acrylonitrile polymers, however, are expensive. Therefore, economic utilization of these solvents to form shaped articles necessitates an expensive recovery set-up. While this does not prevent commercialization of acrylonitrile polymers, it is very desirable to provide more convenient and more economical processes for the production of shaped articles.

Polyacrylonitrile and its copolymers and interpolymers containing a major portion of acrylonitrile are quite unlike other polymers such as other vinyl polymers and synthetic cellulose compositions. The acrylonitrile polymers of this invention are relatively unreactive, insoluble and hydrophobic compounds. These polymers consistently present exceedingly difficult problems, for example, in the formation of solutions therefrom, in the dyeing of shaped articles therefrom, and in the formation of shaped articles therefrom.

An object of this invention is to form shaped articles from infusible acrylonitrile polymers by the use of non-solvent impregnants. A further object is the provision of a process for preparing yarns, films, monofils, and bristles and other shaped articles from polyacrylonitrile and its copolymers without using solvents. A still further object is the provision of a process for making shaped articles from polymers of acrylonitrile utilizing non-solvent impregnants to facilitate the formation of such shaped articles.

These objects may be accomplished by impregnating finely-divided or comminuted acrylonitrile polymers containing at least 85% by weight of acrylonitrile with a suitable non-solvent impregnant, heating the mixture of polymer and impregnant to the desired temperature and then extruding the flowable composite through a shaped orifice by means of pressure and then coagulating. These impregnants are hydroxylated materials such as phenol, ethylene glycol, glycerol and mixtures thereof. These are not solvents for the acrylonitrile polymers. This invention relates in particular to the use of phenol, ethylene glycol and glycerol as the impregnants. In copending application Serial No. 41,412, of C. D. Coxe, a process is disclosed wherein the impregnant used comprises water. While this invention is primarily concerned with non-aqueous impregnants, water can be used in conjunction with the impregnants of this invention. In any event the impregnants of this invention afford the advantage that lower pressures may be used in the extrusion step.

Heated air or other evaporative or coagulative medium is circulated in the cell into which the composite is extruded to assist in coagulating the shaped article and/or evaporating or removing the impregnant. Removal of the impregnant may be negligible or complete depending upon the type of product desired. By this invention, there are produced, for example, fibers, monofils or yarns of acrylonitrile polymers, such as of polyacrylonitrile useful for bristles, screening, etc. The filaments may be after-stretched or otherwise subjected to finishing operations generally used in the textile art.

The following examples, in which parts are by weight unless otherwise specified, are given for illustrative purposes and are not to be considered as limitative in any way.

Example I

Powdered, dry polyacrylonitrile having a molecular weight in the vicinity of 55,000 is mechanically mixed with phenol in a suitable blendor to give an intimate mixture containing 30% phenol and 70% polyacrylonitrile. This mixture is then transferred to an autoclave fitted with a spinneret having one hole which is 0.35 millimeter in diameter. The impregnated polymer spins readily to form a uniform filament at an autoclave temperature of 170°, and under a pressure of 500 p. s. i. The yarn formed by this process is light yellow in color, smooth, quite transparent and of good quality. The treated polymer is not decomposed since it contains approximately its original nitrogen content.

If a spinneret containing a plurality of holes is used, a multi-filament is produced, and if a narrow slot is used as the orifice, a film is obtained. If the polymer and phenol (equivalent to 30%) are placed separately in the cell and the experiment is repeated substantially as described above, decomposition of the polymer occurs with either the production of no filament at all or of a filament having very poor strength, bad color and irregular properties, all of which are due, in part, to decomposition of the polymer. If no phenol is used, the polymer cannot be melt spun even at 220° C. and 20,000 pounds per square inch pressure.

Example II

Powdered polyacrylonitrile having a molecular weight of 60,000 is vigorously stirred in a blendor with a mixture of phenol and water. The resultant composition contains 16% phenol, 16% water and 68% polyacrylonitrile. This mass is then introduced into an autoclave, as described in Example I, having a single-hole spinneret. The combination is spun readily into a monofil at 170° C. and 7,000 p. s. i. pressure. When cooled by a stream of concurrent air, the extruded material solidifies to form a clear, colorless monofil. Similar mixtures of phenol with ethylene glycol and glycerol are also suitable.

By using water the amount of phenol needed is considerably reduced as shown above. When 15% water is used, no more than 20% phenol is required. Employing water makes the process more economical.

Examle III

Powdered polyacrylonitrile with a molecular weight in the vicinity of 80,000 is soaked in ethylene glycol, filtered and then pressed to remove excess glycol. The filter cake so prepared contained 76% ethylene glycol. This impregnated mass is then placed in an autoclave having a spinneret which has a single hole the diameter of which is 0.35 millimeter. At a temperature of 150° C. is at a pressure of 10,000 p. s. i. the blend extrudes readily and a very highly crimped filament is formed.

Although this invention has been described with particular regard to polyacrylonitrile, the process of this invention is equally useful in the spinning or shaping of such acrylonitrile copolymers and interpolymers as have heretofore been well-known in the art, i. e. acrylonitrile copolymers and interpolymers containing at least 85% by weight of acrylonitrile. It is, therefore, within the scope of this invention to form shaped articles by the process of this invention from copolymers and interpolymers in which, acrylonitrile is copolymerized or interpolymerized with polymerizable substances such as, for example, compounds containing one or more ethylenic linkages, e. g. vinyl acetate, vinyl chloride, acrylic acid and its esters and homologs, styrene, vinyl pyridines, isobutylene, butadiene, as well as other vinyl and acrylic compounds, other olefinic or diolefinic hydrocarbons, etc., and polymers from such substances.

Polyacrylonitrile and its copolymers for use with this invention are preferably prepared by the reduction activated ammonium persulfate catalyzed polymerization of monomeric acrylonitrile with or without other monomeric materials dissolved or emulsified in water. It can, however, be prepared by any other suitable type of polymerization reaction such as, for example, the emulsion type reaction disclosed by U. S. Patent 2,160,054. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \dfrac{\text{viscosity of solution}}{\text{viscosity of solvent}} - 1$ and C = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. Increasing or decreasing the amount of the catalyst, while maintaining the other conditions constant, decreases or increases the molecular weight of the polymer. Acrylonitrile copolymers and interpolymers containing at least 85% by weight of acrylonitrile and likewise preferably possessing a molecular weight of 15,000 to 250,000 or higher can be prepared in a similar manner.

As disclosed in the examples, the present invention is particularly applicable to the production of filamentary articles that have a basis of at least 85% by weight of polyacrylonitrile. Of course, however, useful films and foils may also be produced in this manner, as in Example I. Filamentary articles may be produced by extruding the impregnated material through orifices and continuously collecting the extruded materials on rotating drums or the like, preferably at a rate in excess of that at which they emerge from the orifices so that drawdown is applied while they are still in a more or less flowable condition. Preferably, the materials are extruded while at elevated temperatures. Heating may be accomplished by any suitable means, as, for example, electrically or by means of a steam coil.

In the fixing step, the extruded materials are received directly after leaving the orifices in a cell containing a gaseous, vaporous or liquid medium. In dry spinning the medium has a composition that is maintained at such a temperature and pressure that any tendency for rapid changes in the composition or physical state of the extruded material is reduced. The pressure of the evaporative or coagulative medium is preferably maintained in the neighborhood of that corresponding to the vapor pressure of the hydroxylated non-solvent impregnant at the temperature of extrusion. By so doing any tendency of the impregnant to flash off at a reduced pressure, i. e. atmospheric pressure, and consequently disrupt the fibers or leave large holes therein is obviated. This pressure will ordinarily be nominal, i. e. 1 to 5 atmospheres, since the pressure in the autoclave is expended in extruding the material and the only necessity for a receiving pressure vessel at all is the high vapor pressure of the lower boiling hydroxylated non-solvent impregnants at the elevated extrusion temperatures.

The evaporative medium employed in dry-spinning of filaments and yarns or the dry-casting of films in accordance with this invention may be any vapor inert to the film or filament-forming impregnated polymer, such as air, nitrogen, steam or any suitable mixture thereof. The temperature of the evaporative medium is dependent on such factors as the dimensions of the spinning cell, the composition and rate of extrusion of the impregnated mixture and the rate of flow of the evaporative medium. It is only necessary that these several factors be so correlated that the yarn or other shaped article leaving the spinning cell is sufficiently free of the impregnants so that the article is solidified and is capable of being wound to package form or otherwise collected.

Furthermore, shaped articles of acrylonitrile polymer can also be formed by extruding the impregnated polymer particles into a suitable bath at a suitable temperature which bath comprises a liquid that coagulates the polymer and is chemically inert toward the acrylonitrile polymer. As examples of such liquids, may be mentioned water, glycerine, organic solvents, such as alcohol, ether, etc. or aqueous solutions of salt, alkali or acid.

Distribution of all of the non-solvent impregnant and other agents should be as uniform as possible throughout the polymeric composition, before introducing the plastic mass into the autoclave for extrusion. This uniformity of composition may be obtained by mixing or stirring together the impregnant and the acrylonitrile polymer or by a milling operation wherein the agents and polymer are worked between rotating rollers until a mass of the desired consistency and composition is obtained.

The hydroxylated materials used as the non-solvent impregnants in this invention for the formation of shaped articles from acrylonitrile polymers may be present in amounts as high as 80% of the total composition and as low as 10%, with the range 20%–40% preferred.

The pressure to be used to extrude the impregnated acrylonitrile polymers to form shaped articles is largely dependent upon the particular impregnant used, the amounts of such in the mass to be extruded and the temperature at which the extrusion takes place. Generally speaking, however, it can be said that pressures ranging from as low as 250 lb. per square inch up to 25,000 lb. per square inch or even higher may be used. In the process of this invention wherein phenol, glycerol or ethylene glycol is employed as the impregnant, a presure range of from 400 to 10,-000 lbs. per square inch is preferred. The pressure can be applied in any convenient manner as by means of a hydraulically operated piston.

While it has been disclosed that this method of forming shaped articles from acrylonitrile polymers is carried out preferably at a temperature 150° C.–170° C., it is, of course, to be understood that these temperatures do not represent the operative limits. For example, depending upon the pressure, amount and type of impregnant, etc., the temperature may be as low as 100° C. or as high as 200° C. It will normally not be advisable to go above this upper limit since excessive heating leads to decomposition of the acrylonitrile polymers. When phenol, ethylene glycol or glycerol is employed as the impregnants temperatures of from 140 to 170° C. are preferred.

The yarns, films, monofils and other shaped articles obtained by this process can be advantageously subjected to a stretching operation of the type commonly used in the textile art to increase the tenacity and reduce the elongation of a synthetic fiber-forming material. This stretching of the formed article may be performed at any suitable time and at any desired draw or stretch ratio within the limits of the material. In the case of articles formed by the process of the invention, it may be preferably performed before the article has been completely coagulated or dried. The orientation of the structure thus obtained greatly improves the physical properties of the structure, including its tenacity, resilience, etc.

The process of this invention is especially useful for the formation of shaped articles from acrylonitrile polymers without the use of solvents. Filaments, films, monofils, yarns or other shaped articles may be easily formed by the process described herein. The impregnants employed may be allowed to remain in whole or in part in the shaped article, if desired.

This process represents a method whereby it is not necessary to use solutions of acrylonitrile polymers in the formation of shaped articles. This is a distinct advantage since most of the acrylonitrile polymer solvents are expensive. Further, the non-solvent impregnants described herein are very cheap. With certain of them, such as water, there is no recovery problem. This invention provides a saving in the cost and this factor is of considerable commercial importance in the exploitation of the acrylonitrile polymers. Again, the process of this invention for forming shaped articles from acrylonitrile polymers is important since it represents a process whereby it is not necessary to use large amounts of solvents in order to form filaments, fibers, monofils, etc. This represents a considerable saving since it is not necessary to install a large solvent recovery system in order to achieve a commercially satisfactory process. It has an advantage over wet-spinning processes in that complicated drying steps are obviated.

It is indeed surprising that the hydrophobic acrylonitrile polymers can be successfuly pressure extruded through the use of hydrophlic materials such as the hydroxylated non-solvent impregnants disclosed herein. Normally, at elevated temperatures acrylonitrile polymers containing at least 85% of acrylonitrile decompose and are not converted to a fused state. By incorporating a foreign material, such as phenol, which is normally shed by the polymers, one can pressure extrude the non-solvent impregnant/-polymer composites at certain elevated temperatures without decomposition with the formation of useful shaped articles. This unexpected result allows for the avoidance of the use of expensive polymer solvents.

Any departure from the above description which conforms to the present invention is intended to be included within the scope of the claims.

I claim:

1. A process for the production of shaped articles from acrylonitrile polymers containing at least 85% acrylonitrile which comprises impregnating the said polymers in solid, comminuted form with from 10% to 80% of a hydroxylated substance selected from the group consisting of ethylene glycol, glycerol and phenol; heating the resultant impregnated polymers in an enclosed chamber having an extrusion orifice; exerting pressure on said impregnated polymers in said chamber, thereby extruding them through said orifice; and setting the resultant shaped articles.

2. A process in accordance with claim 1 wherein said polymer is polyacrylonitrile.

3. A process in accordance with claim 1 wherein said polymer is a polymer of acrylonitrile and styrene.

4. A process in accordance with claim 1 wherein said polymer is a polymer of acrylonitrile and 2-vinyl pyridine.

5. A process for the production of shaped articles from acrylonitrile polymers containing at least 85% acrylonitrile which comprises impregnating said polymers in solid, comminuted form with from 10% to 80% of a hydroxylated substance selected from the group consisting of ethylene glycol, glycerol and phenol; heating the resultant impregnated polymers in an enclosed chamber having an extrusion orifice to a temperature of from 140° C. to 170° C.; exerting pressure on said impregnated polymers in said chamber, thereby extruding them through said orifice; and setting the resultant shaped articles.

6. A process in accordance with claim 5 wherein a pressure of from 400 to 10,000 pounds per square inch is applied.

7. A process in accordance with claim 5 wherein a pressure of from 400 to 10,000 pounds per square inch is applied and the polymer is polyacrylonitrile.

8. A process in accordance with claim 5 wherein said hydroxylated substance is phenol.

GEORGE M. ROTHROCK.

REFERENCES CITED

The following references are of record in the file of this patent:

UNITED STATES PATENTS

| Number | Name | Date |
|---|---|---|
| 2,163,636 | Spanagel | June 27, 1939 |
| 2,214,442 | Spanagel | Sept. 10, 1940 |
| 2,404,717 | Houtz | July 23, 1946 |
| 2,404,724 | Houtz | July 23, 1946 |
| 2,425,086 | D'Alelio | Aug. 5, 1947 |